July 2, 1935.    F. J. HIRSCHMANN    2,007,050
LINE DRIER
Filed Dec. 22, 1932    2 Sheets-Sheet 1

Inventor
F. J. Hirschmann.
By Lacey & Lacey, Attorneys

July 2, 1935.  F. J. HIRSCHMANN  2,007,050
LINE DRIER
Filed Dec. 22, 1932  2 Sheets-Sheet 2
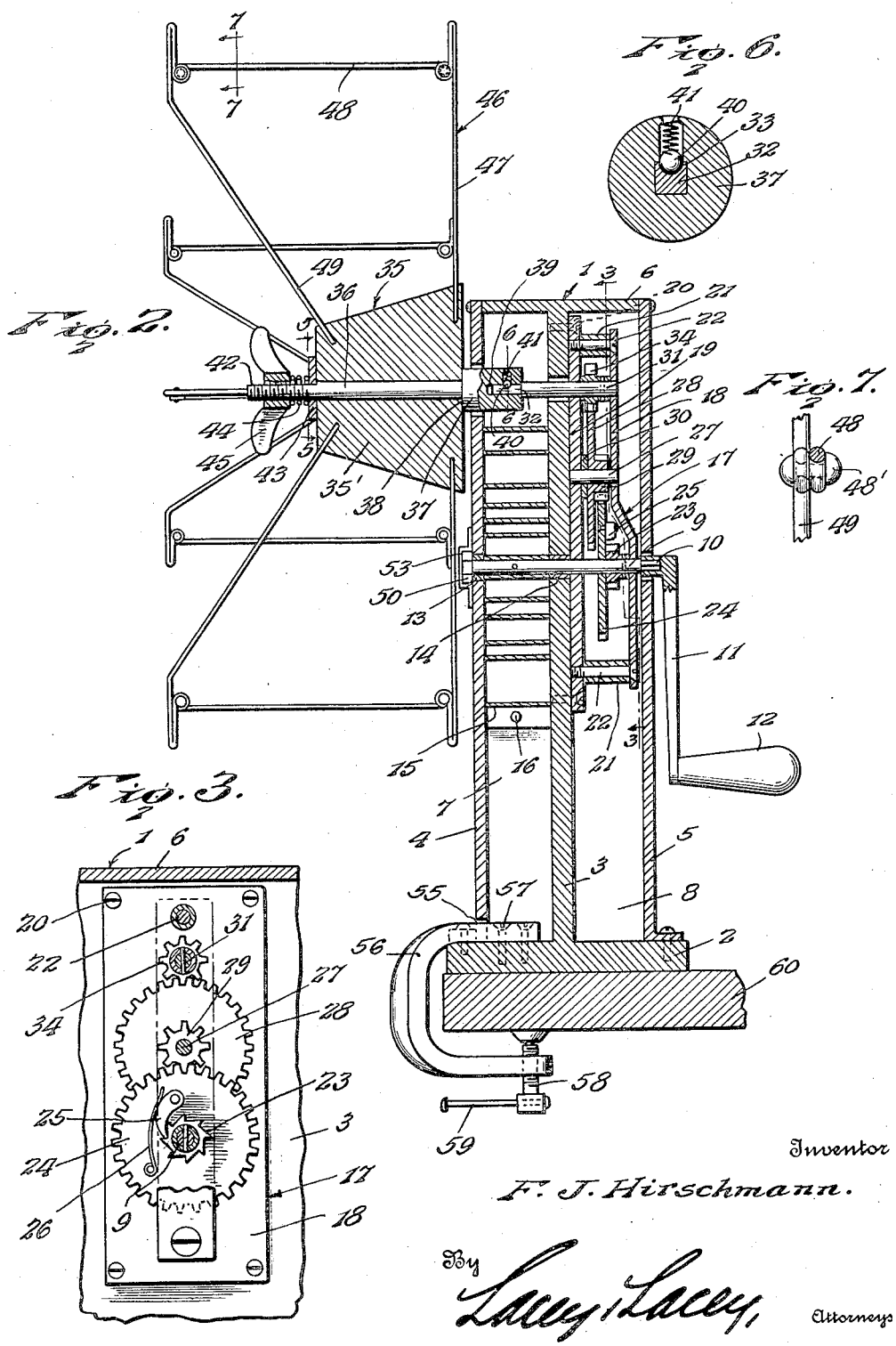
Inventor
F. J. Hirschmann.
By Lacey & Lacey, Attorneys Patented July 2, 1935

2,007,050

UNITED STATES PATENT OFFICE 2,007,050

LINE DRIER

Frederick J. Hirschmann, San Leandro, Calif.

Application December 22, 1932, Serial No. 648,480

4 Claims. (Cl. 242—102)

This invention relates to an improved line drier which is adapted for use with fishing lines and the like.

One object of the invention is to provide a line drier which will facilitate the drying of a fishing line thereon and will largely eliminate the danger of entangling of the line.

Another object of the invention is to provide a device of this character having a drying reel and being provided with means for automatically winding a fishing line from a fishing reel onto the drying reel.

A further object of the invention is to provide a line drier which may be readily taken apart for transportation from place to place and which may be set up with the utmost facility.

A further object of the invention is to provide a line drier wherein gearing is employed so that the line will be held taut and will pass slowly from the fishing reel to the drying reel in a manner to permit thorough inspection of the line for possible defects therein.

And a still further object of the invention is to provide a line drier which will be characterized by utmost ruggedness and simplicity.

Other and incidental objects of the invention, not particularly mentioned in the foregoing, will be apparent as the description of the invention proceeds.

Figure 1:
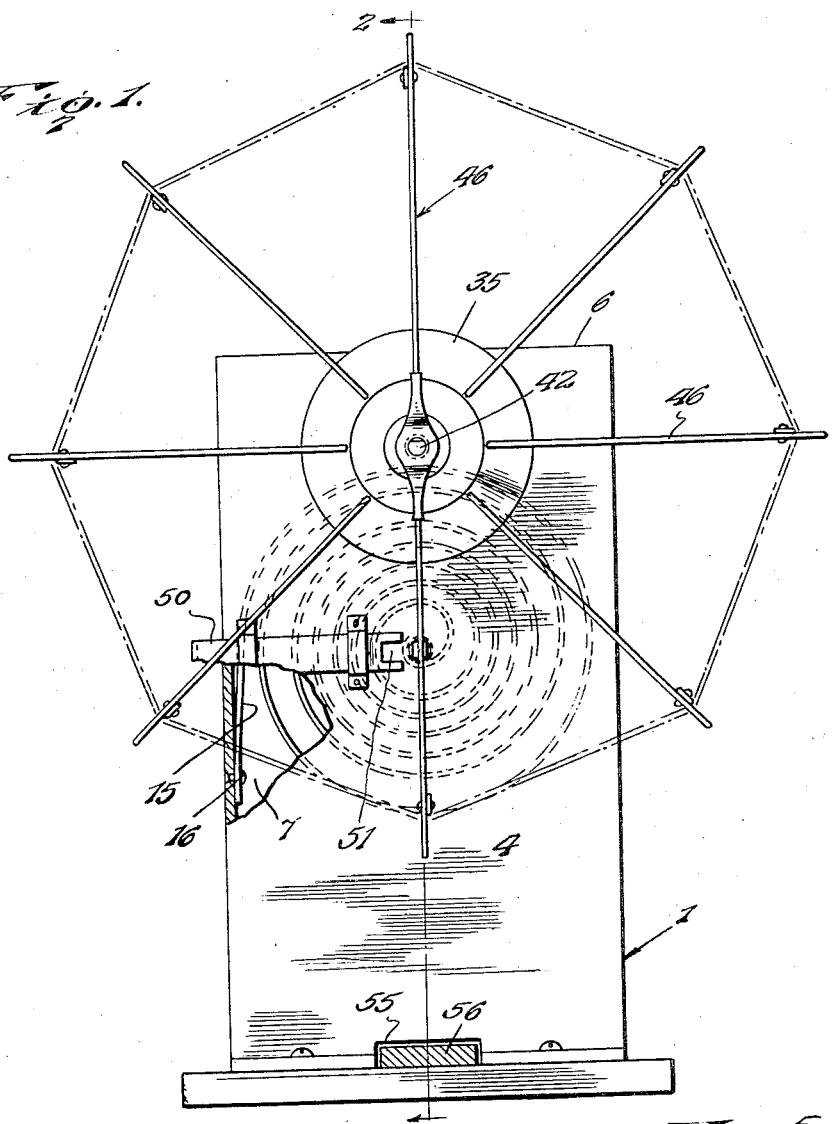
Figure 4:
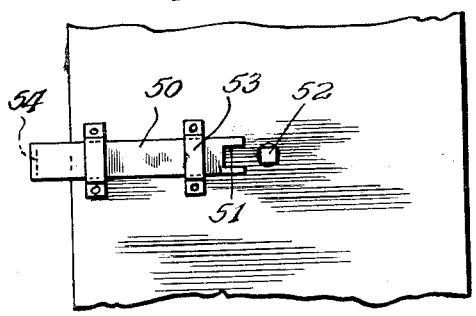
Figure 5:
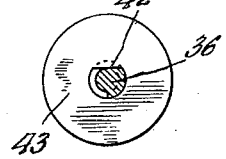

In the drawings forming a part of the present application, Figure 1 is a front elevation of the device, Figure 2 is a vertical sectional view of the device, taken on the line 2—2 of Figure 1, looking in the direction indicated by the arrows, Figure 3 is an enlarged fragmentary vertical sectional view on the line 3—3 of Figure 2, looking in the direction indicated by arrows, Figure 4 is an enlarged fragmentary plan view showing the locking means employed, Figure 5 is a fragmentary sectional view on the line 5—5 of Figure 2, Figure 6 is an enlarged vertical sectional view on the line 6—6 of Figure 2, And Figure 7 is an enlarged fragmentary sectional view on the line 7—7 of Fig. 2, showing the hinged construction of the line retainers.

Referring now more particularly to the accompanying drawings, the numeral 1 indicates a rectangular casing which is preferably cast from light weight metal and is provided with a relatively thick bottom wall 2 and a relatively thick vertical center supporting wall 3. Normally closing the casing at its front and rear sides are front and rear walls 4 and 5 which are relatively thin with respect to the center supporting wall. The front and rear walls may be held in position by screws which are screwed into a top wall 6 and the bottom wall 2 of the casing. The front and rear walls cooperate with the center supporting wall to define compartments 7 and 8.

Carried by the casing 1 and extending transversely through the walls thereof is a center shaft 9 having its outer end portion reduced and squared, as indicated by the numeral 10 to project into the squared socket of a suitable key or crank, such as is indicated by the numeral 11. The crank is removable and should have a relatively large radius so that rotation thereof may be effected with the utmost ease. The crank is provided with a handle 12 which is of any desired embodiment. The front wall 4 is provided with a soft metal bearing 13 which journals the end of the shaft 9 carried therein, and the center supporting wall 3 is likewise provided with a relatively soft metal bearing 14.

Carried in the compartment 7 and having one end thereof secured to the shaft 9 is a flat circular band type spring 15 having its outer end secured to an end wall of the casing by means of a stud 16. As best seen in Figure 2 of the drawings, the spring is of such a width that it will fit snugly between the walls 3 and 4 but will be allowed to expand freely in its well known manner.

Mounted within the compartment 8, near the upper end thereof, is a small frame 17 which comprises front and rear walls 18 and 19. The frame is preferably secured to the center supporting wall 3 by means of screws 20 or in any other desired manner. Spacing the front and rear walls 18 and 19 from each other are sleeves 21 which surround screws 22. As best seen in Figure 2 of the drawings, the front wall 18 is offset substantially medially of its length so that the lower end portion of the frame 17 is wider than the upper end thereof. The sleeve 21, at the lower end of the frame and the screw 22 extending therethrough will, of course, be of greater length than the one carried at the upper end of the frame. The shaft 9, as will be observed, extends through both the walls 19 and 18, and the wall 18 largely provides support for the outer end of said shaft adjacent the squared portion thereof. Fixed to the shaft 9 and disposed near the inner surface of the wall 18 is a ratchet wheel 23 which will rotate with the shaft 9 as it is turned. Rotatably mounted on the shaft 9 and disposed adjacent the ratchet wheel and rotatable with respect thereto is a gear or cog wheel 24. Swingingly mounted on the gear wheel 24 is a pawl 25 which is adapted to engage the ratchet wheel 23. Mounted on the gear wheel 24 is a wire spring 26 which keeps the pawl in constant engagement with the ratchet. Extending between the walls 18 and 19, substantially medially of the length of the frame 17, is a stub shaft 27 and mounted on said shaft is a double gear wheel comprising a relatively large intermediate gear 28 and a small integral pinion 29. Mounted on the stub shaft 27, between the wall 19 and the inner face of the large gear 28 is a bushing 30 which will prevent the gear 28 and integral pinion 29 from shifting longitudinally on the stub shaft 27. Rotatably mounted in the frame 17, near its upper end, is a shaft 31 which is journaled by the walls 18 and 19 and is projected through the wall 3 and is provided with a reduced squared outer end portion 32 having a hemispherical socket 33 medially of said reduced portion 32. As will be observed, the shaft 31 terminates within the compartment 7 substantially medially between the walls 3 and 4. Fixed to rotate with the shaft 31 and disposed between the walls 18 and 19 of the frame 17 is a small pinion 34. It should be understood that the spring may be mounted in compartment 8 and the gears in compartment 7 if desired.

Associated with the casing 1 is a reel 35 which comprises a frusto-conical hub 35' which may be formed of wood, composition, or any other desired material. Extending axially through the hub but frictionally rotatable with respect thereto is an axle 36 which is provided with an enlarged portion 37 normally extending through the wall 4 and defining a shoulder 38 which abuts the inner end of the hub 35'. Mounted in the inner end of the enlarged portion 37 and adapted to project into the socket 33 in the shaft 31 is a latching ball 40 which is maintained projected downwardly by means of a small coil spring 41. The socket 39 is adapted removably to receive the reduced portion 32 of the shaft 31. As will be observed, the outer end portion of the axle 36 is threaded and is provided with a flattened portion 42. Overlying the outer end of the hub 35' is a washer 43, the opening of which is provided with a straight portion to conform to the flat side 42 of the axle. The washer will, of course, rotate with the axle. Normally overlying the washer 43 and surrounding the threaded portion of the axle 36 is a small coil spring 44 and normally screwed on the end of the threaded portion of the axle 36 is a wing nut 45. The wing nut is adapted to be screwed toward the hub 35' for increasing the tension of the spring 44 which will bear against the washer 43 and will tightly clamp the hub 35' between said washer 43 and the shoulder 38. The hub 35' will, therefore, be caused to rotate with the axle as a unit. However, as the wing nut 45 is loosened, with consequent relieving of tension of the spring 44, the hub 35' will be permitted to rotate frictionally with respect to the axle 36.

Carried by the hub 35' are radially extending line retainers 46 which are preferably formed of wire. While I have shown eight line retainers in the present instance, it should be understood that I may employ as many line retainers as I desire. The line retainers are each preferably formed from strands of stiff wire. A typical line retainer would include a straight leg 47 which is bent upon itself at its upper end portion and looped. A cross arm 48 with a loop at each end thereof is hingedly connected to the loop of the leg 47 by means of a stud 48', as shown in Fig. 7. The line retainer also includes an inclined leg 49 which is bent at its outer end portion to extend parallel with the end portion of the leg 47 and then bent upon itself to form a loop which is hingedly connected to the arm 48 by a stud similar to the stud 48'. It will be seen that the line to be wound upon the reel will rest upon the cross arms 48 between the loops. The free ends of the legs 47 and 49 are removably carried in the hub 35' so that the line retainer may be readily removed from said hub and, in view of the fact that the legs 47 and 49 are hingedly connected to the arm 48, the line retainers may be folded so that bending thereof will not be caused when the device is being transported.

Mounted on the front wall 4 medially of its height is a transversely extending locking bar 50 which is provided at its inner end with a square socket 51 which is adapted to engage an extended squared end 52 of the shaft 9. The bar is formed preferably of metal. Securing the locking bar 50 to the end wall is a pair of guide straps 53. The locking bar 50 is extended at its outer end and bent to form a finger lug 54. It will be understood that the bar 50 is adapted to be shifted for engaging the end portion 52 within the socket 51 so that the shaft 9 will be locked against rotation when desired.

Formed in the lower end of the wall 4 is an opening 55 and normally carried within the opening is one branch of a U-shaped clamp 56 which is secured to the bottom wall 2 of the casing by means of screws 57. Carried by the clamp is the usual clamp screw 58 which is provided with a turning handle 59. The clamp 56 is provided for securing the entire device to a table, a portion of which is shown at 60, or to any other stationary object, when the device is in use.

In use, when it is desired to dry the fishing line, an end thereof is fed from the fishing reel to the hub 35' of the reel 35. The spring is then wound by rotating the crank 11 and the device may be locked with the spring wound by engaging the locking bar 50 with the squared end 52 of the shaft 9. When the crank is released and the locking bar 50 is likewise disengaged from the shaft 9, the spring 15 will unwind and rotate the shaft and the ratchet wheel 23 will engage the pawl 25 which is carried on the gear wheel 24 and will cause said gear wheel to rotate, which will in turn, rotate the gear wheel 28 and the pinion 34 and consequently rotate the reel 35 for winding the line from the fishing reel on to the line retainers 46. It is to be understood that the spring will be of a size great enough to wind completely a fishing line of ordinary size onto the reel, but if the line should be of unusual length, the reel may be locked or held by the hand and the spring again wound for further reeling. It is to be noted that the relatively large drying surface afforded by the reel will facilitate the quick drying of a line thereon.

When it is desired to regulate the speed of the reel during a winding operation when the line is passing from the fishing reel to the line retainer, it is only necessary to apply pressure of the thumb on the fishing reel in the manner commonly employed by fishermen and known as "thumbing the reel". The speed of the line may therefore be regulated to a nicety so that any imperfections in the line may be readily observed as the line passes from the reel to the line retainer.

Reverse rotation of the line retainer will wind the spring and permit transfer of the line back to the fishing reel.

In certain instances it will be found that when the spring 15 has been rewound there is still more line to be transferred from the line retainer to the fishing reel, in which event the wing nut 45 is loosened and the spring locked against unwinding by the bar 50. The loosening of the nut 45 loosens the tension of the spring 44 and the washer 43 on the face of the hub 35' so that the hub will be permitted to slip about the shaft 36 in frictional engagement therewith. In this manner an indefinite amount of line can be run from the drier reel onto the fishing reel without winding the spring tightly. However, if this provision were not made it would be necessary to remove the line drier reel and replace it after the rewinding which is effected by the counter rotation of the hub and gearing. With a little bit of experience the person using the device will know when to tighten the wing nut and to permit the line to pass from the drier to the fishing reel and wind the spring on the drier, and still not leave any of the line on the drier. The spring will thus be left in a wound position for the next drying operation.

If desired, after a line has been wound upon the retainers 46, the entire reel may be removed from the casing by virtue of the fact that the enlarged portion 37 with the socket 39 therein may be disengaged from the squared end portion 32 of the shaft 31. The reel thus removed may be stored in a desired place and another reel placed thereon for winding a separate line, if desired. It will be seen, therefore, that the same casing and winding mechanism may be employed for any number of reels.

It is believed that, from the foregoing description, it will be seen that I have provided a simple device of this character which will be highly efficient in use.

Having thus described the invention, what I claim is:

1. A device of the class described including a casing having a center supporting wall, front and rear walls carried by the casing and defining compartments, a shaft extending through said center supporting wall and said front wall and into said rear wall, said shaft having a reduced squared end portion, a spring carried in one of said compartments and having an end secured to said shaft, the other end of said spring being secured to a wall of the casing, a frame carried in the other of said compartments, a ratchet wheel carried on the shaft within the frame, a cog wheel rotatable about the shaft and having a pawl for engagement with the ratchet wheel, an intermediate gear and pinion carried in the frame and cooperating with the cog wheel, a second pinion carried within the frame and cooperating with said intermediate gear and pinion, a shaft carried by the frame and locked to said pinion, and a reel associated with the frame and having an axle provided with an enlarged portion, said enlarged portion being removably connected with said second mentioned shaft, the reel being rotatable by the unwinding of the spring and the consequent rotation of the gears and pinions for winding a line thereon.

2. A device of the class described including a casing having a shaft provided with a reduced squared end portion, means within said casing for rotating said shaft, a reel associated with the casing and comprising a hub, an axle extending through and frictionally held in the hub, and line retainers carried by the hub, said axle having one end journaled in a side of the casing and provided with a socket to removably receive the squared end portion of the shaft, and a detent in the axle to lock the axle to the shaft, the reel being rotatable by the shaft for winding a line thereon.

3. A device of the class described including a casing having a center supporting wall, front and rear walls carried by the casing and cooperating with said center supporting wall to define compartments, a rotatable shaft extending through the front and center supporting walls into said rear wall, a spring in one of said compartments wound about the shaft and having one end secured to the shaft and its opposite end secured to the wall of the casing, a frame carried within the casing and secured to the center supporting wall, a ratchet wheel fixed to the shaft within the frame, a gear wheel rotatable about the shaft and having a pawl to engage the ratchet wheel, an intermediate gear carried within the frame and having an integral pinion to engage the first mentioned gear, a second shaft carried by the frame at its upper end and extending through the center supporting wall into the compartment carrying the spring, a pinion fixed on said shaft and cooperating with said second mentioned gear, means for rotating the first mentioned shaft for winding the spring, a reel removably connected with said second mentioned shaft and rotatable by the unwinding of the spring and the gearing within the frame for winding a line thereon, and means on the outside of the casing for locking the reel in a stationary position.

4. A device of the class described including a casing, a shaft mounted in the casing, an axle alined with and detachably connected to the shaft, means within the casing for rotating the shaft and the axle, a hub frictionally held on the axle, line retainers each including a straight radial leg parallel with the wall of the casing, an inclined leg in outwardly divergent relation to the first mentioned leg, both said legs being removably fitted in the hub, and a straight arm parallel with the axle extending between and pivoted at its ends to the legs at points spaced inwardly from the outer ends of the legs, the end portions of the legs beyond said arm being normally parallel.

FREDERICK J. HIRSCHMANN. [L. S.]